United States Patent Office 3,022,276
Patented Feb. 20, 1962

3,022,276
PROCESS FOR THE PREPARATION OF CHLO-
RINATED AND SULFOCHLORINATED POLY-
OLEFINS
Ludwig Orthner, Horst Herzberg, and Franz Landauer, Frankfurt am Main, Germany, assignors to Farbwerke Hoechst Aktiengesellschaft vormals Meister Lucius & Brüning, Frankfurt am Main Hochst, Germany, a company of Germany
No Drawing. Filed Apr. 24, 1957, Ser. No. 654,649
Claims priority, application Germany Apr. 30, 1956
9 Claims. (Cl. 260—79.3)

The present process relates to a process for the preparation of chlorinated and sulfochlorinated polyolefins.

There has already been proposed a process for chlorinating and sulfochlorinating polyethylene, which comprises first prechlorinating polyethylene prepared according to a low pressure process, for example the Ziegler process, i.e. by polymerizing ethylene with catalyst mixtures consisting of organometallic compounds, preferably aluminoorganic compounds, and compounds, especially salts of the elements of subgroups IV–VI of the periodic table, in chlorinated hydrocarbons boiling below 100° C. such as methylene chloride, chloroform, trichlorethylene, preferably carbon tetrachloride, first under pressure at temperatures between 100–160° C., preferably between 105–115° C., and subsequently reacting said polyethylene under atmospheric pressure at temperatures between +20 and +80° C. with chlorine or chlorine and sulfur dioxide until the desired content of chlorine or chlorine and sulfochloride is obtained.

It is necessary to prechlorinate low pressure polymers of ethylene under pressure since, in contradistinction to high pressure polyethylenes, they are soluble in common chlorination media only at temperatures above 100° C. Contrary thereto, high pressure polyethylenes dissolve already at about 60° C. By the introduction of about 5% of chlorine the prechlorination under pressure suddenly improves the solubility depending on the temperature used of the low pressure polyethylene so that a low pressure polyethylene of this kind containing 5% of chlorine is now soluble in chlorinated hydrocarbons boiling below 80° C. and it can be chlorinated or sulfochlorinated under normal pressure until the desired content of chlorine or chlorine and sulfur is obtained.

Now we have found that polymers of lower aliphatic or cycloaliphatic hydrocarbons having at least 3 carbon atoms, for instance those with up to 8 carbon atoms and containing a polymerizable vinyl group such as propylene, butylenes, pentenes, vinylcyclohexane or vinylcyclohexenes, said polyolefins being prepared according to a low pressure process, for example the Ziegler process can be reacted according to the process already proposed for polyethylene with chlorine or simultaneously with chlorine and sulfur dioxide first under elevated pressure and subsequently under normal pressure whereby reaction products are formed containing chlorine or simultaneously chlorine and sulfur. The monomers, mentioned above containing not more than 1% of ethylene can be polymerized alone or in mixture.

When carrying out said low pressure polymerizations there are obtained as a rule two modifications of the polymer. One portion of the polymer has an amorphous structure and the other portion is crystalline. The crystalline portions very often contain enclosed amorphous portions (and vice versa). It is especially advantageous to carry out the process of the invention with the crystalline portion which is more sparingly soluble than the amorphous portion.

When carrying out the process according to the invention it is surprising that by the introduction of only 2–4% of chlorine reaction products are formed which are now soluble at a temperature of 80° C. and which can then be further chlorinated or sulfochlorinated under normal pressure. By prechlorinating under pressure at temperatures above 100° C. the insoluble polyolefins or copolyolefins can be chlorinated in a homogeneous solution in a low boiling chlorinated hydrocarbon. It is not possible to prepare products of this kind in solvents boiling below 80° C. according to another process. The following chlorination under normal pressure and at lower temperatures which is only rendered possible by the prechlorination under pressure preserves the products to a high degree, which fact becomes apparent by a reduced decomposition during the chlorination process and an improved thermal stability of the reaction products against chlorine.

By the chlorination under pressure it is possible to introduce into the products any desired amount of chlorine up to a chlorine content of 75%. It is advantageous, however, to introduce by the chlorination under pressure only a few percent of chlorine and to introduce the main amount of chlorine or chlorine and sulfur under normal pressure.

The chlorination and sulfochlorination can be rendered possible or accelerated with the use of radicals or catalysts in the usual manner with metal halides, for example of aluminum, iron or tin, with azo compounds such as azo-di-isobutyronitrile and the homologues thereof, with peroxides such as dibenzoyl peroxide, cumene peroxide or acetone peroxide and with the radiation of ultra-violet light. It is furthermore possible to carry out the process in a continuous manner. Depending on the chlorine or chlorine and sulfur content the reaction products thus obtained are rubber-elastic, similar to guttapercha, polyvinyl chlorides, or resins.

It is possible to transform in usual manner the sulfochlorinated compounds into insoluble compounds by cross-linking with polyvalent compounds such as metal oxides, for example magnesium oxide, zinc oxide or lead oxide or halides such as calcium chloride, barium chloride, zinc chloride, aluminum chloride or antimony chloride or polyamines, for example ethylene-diamine, propylene-diamine, triethylene-tetramine or hexamethylene-tetramine. The chlorinated and the sulfochlorinated compounds can be used for the preparation of foils, as intermediate layers for bonding wood, glass, metal, plastic masses and masses which are capable of being hardened. They can, furthermore, be added as plasticizers or flameproofing agents to other plastics such as polyethylene, mixtures of polyethylene and polypropylene, polyvinyl chloride, polyvinyl acetate or the copolymers thereof.

The following examples serve to illustrate the invention but they are not intended to limit it thereto; the parts being by weight.

*Example 1*

100 parts of crystalline polypropylene ($\eta$ spec./c.=5.5) are suspended in 3000 parts of carbon tetrachloride and the suspension is heated to 110° C. 10 grams of chlorine are continuously forced into the suspension against the arising pressure of 2 atmospheres. After one hour the suspension is allowed to cool and the pressure is released. Into the viscous solution additional 45 grams of gaseous chlorine are introduced within one hour at 70° C. After the reaction product has been degassed with nitrogen the chlorinated polypropylene is freed of the solvent by means of steam. The feebly rubber-elastic product contains 13% of chlorine.

*Example 2*

20 parts of crystalline polypropylene ($\eta$ spec./c.=4.4) and 1000 parts of carbon tetrachloride are treated at 110° C. with 30 grams of chlorine. In the normal pressure stage additional 60 grams of chlorine are then introduced.

The product so obtained is resin-like and softens at 110° C. It contains 62% of chlorine.

We claim:

1. An improved process of chlorinating a crystalline low pressure polyolefin selected from the group consisting of homopolymers of monoolefins of 3–8 carbon atoms and copolymers of said olefins with each other, said polyolefins being prepared by the polymerization of said monoolefins in contact with a catalytic amount of a catalyst mixture consisting of an alumino-organic compound and a salt of the elements of subgroups IV–VI of the periodic table, said polyolefins being insoluble in chlorinated aliphatic hydrocarbons boiling below 100° C., said process comprising the steps of chlorinating said polyolefin in a first stage to a chlorine content of about 2–10% by weight of the resulting polymer, said chlorination being conducted under pressure at temperatures ranging from 100–160° C. in a chlorinated aliphatic hydrocarbon in which said polyolefin is insoluble and having a normal boiling point below 100° C. at atmospheric pressure, thereby producing a solution of the partially chlorinated polyolefin, and then in a second stage introducing additional chlorine into said solution under atmospheric pressure at temperatures from 20–80° C. to obtain a chlorinated polyolefin having a chlorine content in excess of 10% by weight but not greater than 75% by weight of the resulting product.

2. The process of claim 1 wherein the solvent is $CCl_4$.

3. The process of claim 1 wherein the polyolefin is crystalline polypropylene.

4. The process of claim 1 wherein 13% by weight of chlorine is introduced into crystalline polypropylene.

5. The process of claim 1 wherein 62% by weight of chlorine is introduced into crystalline polypropylene.

6. An improved process of chlorinating a crystalline low pressure polyolefin, the latter being produced by the polymerization of an unsaturated hydrocarbon selected from the group consisting of propylenes, butylenes, pentenes, vinyl cyclohexane, and vinyl cyclohexenes in contact with a catalytic amount of a catalyst mixture consisting of an alumino-organic compound and a salt of the elements of subgroups IV–VI of the periodic table, said polyolefins being selected from the group consisting of homopolymers and copolymers of said monomers with each other, and being characterized by their insolubility in chlorinated aliphatic solvents boiling below 100° C. under atmospheric pressure, the chlorination process comprising the steps of chlorinating said polyolefin in a first stage under elevated pressure at a temperature of 100–160° C. in a chlorinated aliphatic hydrocarbon in which said polyolefin is insoluble and having a normal boiling point of below 100° C. at atmospheric pressure to form a solution of the partially chlorinated polyolefin, the latter having a chlorine content of 2–10% by weight of the resulting polymer, and then introducing additional chlorine into said solution under atmospheric pressure at temperatures from 20–80° C. to obtain a chlorinated polyolefin having a chlorine content in excess of 10% by weight but not greater than 75% by weight of the resulting product.

7. A process of introducing chlorine into low pressure crystalline polypropylene produced by polymerization of propylene in contact with a catalytic amount of a catalyst mixture consisting of an alumino-organic compound and a salt of an element of subgroups IV–VI of the periodic table, said crystalline polypropylene being insoluble in chlorinated aliphatic hydrocarbon solvents boiling below 100° C. at atmospheric pressure, said process comprising the steps of chlorinating said polypropylene by reacting it with elemental chlorine in a first stage in $CCl_4$, in which said polypropylene is insoluble, at 100° C. to form a solution of partially chlorinated polypropylene, and then in a second stage introducing additional chlorine into said solution under atmospheric pressure and at 70° C. until the chlorinated polypropylene has a content of 13% of chemically bound chlorine, and removing the carbon tetrachloride by distillation.

8. A process of introducing chlorine into a low pressure crystalline polypropylene produced by polymerization of propylene in contact with a catalytic amount of a catalyst mixture consisting of an alumino-organic compound and a salt of an element of subgroups IV–VI of the periodic table, said crystalline polypropylene being insoluble in chlorinated aliphatic hydrocarbon solvents boiling below 100° C. at atmospheric pressure, said process comprising the steps of chlorinating said polypropylene by reacting it with elemental chlorine in a first stage under pressure at 110° C. in $CCl_4$, in which said propylene is insoluble, to form a solution of partially chlorinated polypropylene having a chlorine content of 2–10% by weight of the resulting polypropylene, and then in a second stage continuing the chlorination in said solution under atmospheric pressure at temperatures ranging from 20–80° C. until the chlorinated polypropylene has a content of 62% of chemically bound chlorine, and removing the carbon tetrachloride by means of steam distillation.

9. An improved process of chlorinating a crystalline low pressure polyolefin selected from the group consisting of homopolymers of monoolefins of 3–8 carbon atoms and copolymers of said monoolefins with each other, said polyolefins being produced by the polymerization of said monoolefins in contact with a catalytic amount of a catalyst mixture consisting of an alumino-organic compound and a salt of the elements of subgroups IV–VI of the periodic table, said polyolefins being characterized by their insolubility in chlorinated aliphatic hydrocarbons boiling below 100° C. at atmospheric pressure, said process comprising the steps of chlorinating said polyolefin in a first stage under elevated pressure at a temperature of 100–160° C. in a chlorinated aliphatic hydrocarbon in which said polyolefin is insoluble and having a normal boiling point below 100° C. at atmospheric pressure to form a solution of the partially chlorinated polyolefin, the latter having a chlorine content of 2–10% by weight of the resulting polymer, and then in a second stage further chlorinating the dissolved polymer under atmospheric pressure at temperatures from 20–80° C. in the presence of sulfur dioxide to obtain a sulfochlorinated polyolefin having a chlorine content in excess of 10% by weight but not greater than 75% by weight of the resulting product.

References Cited in the file of this patent

UNITED STATES PATENTS

| | | |
|---|---|---|
| 2,315,037 | Bannon et al. | Mar. 30, 1943 |
| 2,481,188 | Babayan | Sept. 6, 1949 |
| 2,748,105 | Becker et al. | May 29, 1956 |
| 2,849,431 | Baxter | Aug. 26, 1958 |
| 2,879,261 | Johnson et al. | Mar. 24, 1959 |
| 2,920,064 | Baptist et al. | Jan. 5, 1960 |